Dec. 22, 1964 T. W. PARSONS 3,162,804

TRANSLATING INSTRUMENT EMPLOYING HALL-EFFECT DEVICE

Filed Sept. 15, 1961

THOMAS W. PARSONS
INVENTOR.
BY S. A. Giarratana
George B. Oujevolk
ATTORNEYS 3,162,804
Patented Dec. 22, 1964

3,162,804

TRANSLATING INSTRUMENT EMPLOYING HALL-EFFECT DEVICE

Thomas W. Parsons, Brooklyn, N.Y., assignor to General Precision, Inc., Little Falls, N.J., a corporation of Delaware Filed Sept. 15, 1961, Ser. No. 138,339
6 Claims. (Cl. 323—94)

Figure 3:
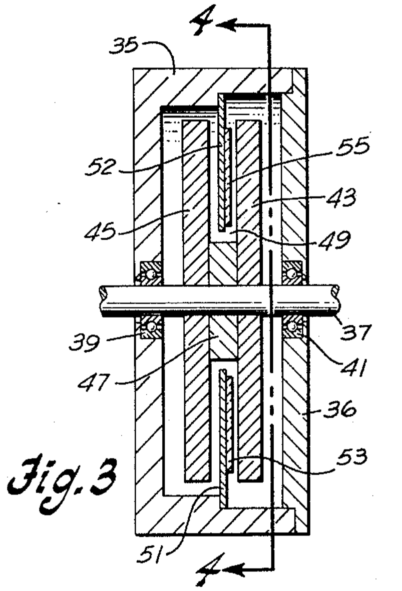

The present invention relates to instruments of the type which translate the angular position of an input shaft into an analog output signal and more particularly to such an instrument making use of Hall effect generators as the sensing means. This type of instrument is referred to as a Hall effect synchro because of its similarity in function to the well-known synchros commonly used in servomechanisms.

Hall effect generators are devices which produce output signals by means of the Hall effect. They generally comprise a semiconductor crystal, through which current is caused to flow. Contacts are provided positioned at right angles to the direction of current flow through the crystal. When this crystal is placed in a magnetic field it will generate an output voltage from the two contacts positioned at right angles. This output voltage can be predicted by the formula $E_h = KBI_c \cos \theta$; in which $E_h$ is the output voltage of the Hall effect generator, K is a constant or the coefficient of the Hall effect generator, B is the strength of the magnetic field in which the Hall effect generator is placed, $I_c$ is the input current to the Hall effect generator, and $\theta$ is the angle between the direction of the magnetic field and normal to the plane of the crystal of the Hall effect generator. The output signal variation from the first developed Hall effect synchros was based on the variation of the output voltage $E_h$ of the Hall effect generator with the angle $\theta$ between the direction of the magnetic field and normal to the plane of the crystal of the Hall effect generator. In these Hall effect synchros the crystal was rotated relative to the magnetic field but remained in the same location relative to the magnetic field so that the strength B of the magnetic field did not vary. These Hall effect synchros provided a nice sinusoidal variation of the output signal with the angular position of the input shaft, but they required a large air gap to provide rotating room for the crystal. This large air gap limited the maximum practical value of the strength B of the magnetic field to a relatively small value and hence the output signal from this Hall effect synchro was small. In order to reduce the air gap and thereby increase the strength of the output signal, a Hall effect synchro was developed in which the crystal of the Hall effect generator was placed in a small air gap between a magnetized rotor and a stator divided into four quadrants providing the magnetic return path for the rotor. In this Hall effect synchro the strength B of the magnetic field passing through the crystal of the Hall effect generator as well as the angle $\theta$ between the direction of the magnetic field and normal to the plane of the crystal of the Hall effect generator varied with the angular position of the input shaft. Therefore in order to obtain a sinusoidal variation of the output signal with the angular position of the input shaft, the magnetic field produced by the rotor must be properly shaped.

This later developed Hall effect synchro is difficult to construct because the stator must be made of laminations and great care must be taken in machining the segments of the stator to final size. Furthermore, hysteresis occurs in the stator iron since the strength of the magnetic field in the stator varies as the rotor rotates. This hysteresis causes errors in the output voltage from the instrument because the flux in the stator iron is a fuction not only of the applied magnetic field strength but also of the recent history of the magnetic field strength. Therefore the output signal depends not only upon the present angular position of the input shaft but also the past angular positions of the input shaft. These hysteresis effects can be reduced by using a larger air gap, but this expedient reduces the maximum strength B of the magnetic field obtainable and therefore reduces the amplitude of the output signal. In addition to these disadvantages, this Hall effect synchro of the prior art has the disadvantage that it is difficult to obtain a sinusoidal output in those instruments in which a permanent magnet rotor is used because in order to shape the magnetic field to obtain the sinusoidal output, the rotor must be machined after it is magnetized. This machining is difficult because most permanent magnet materials have poor machining characteristics.

The Hall effect synchro of the present invention comprises a rotor, which is a magnet, and a low reluctance return path, which is physically connected to the rotor and which moves with it. A plurality of Hall effect generators are mounted in a small, ring-shaped air gap between the magnetized rotor and the return path, which air gap is coaxial with the rotor. This construction entirely eliminates the hysteresis problem because the magnetic field strength applied to the return path never varies. The output signals from the Hall effect generators are a function of the shaft position and will always be the same for the same shaft position. Since the field does not vary in the low reluctance return path it is not necessary to use laminations in the return path. The construction also permits the use of a simple structure as the return path instead of the four quadrants required in the above described Hall effect synchro of the prior art, and thus is more easily constructed than this synchro of the prior art. Since there is no hysteresis problem in the Hall effect synchro of the present invention, the air gap can be made as small as the Hall effect generators and their support permits, thus making large values of magnetic field strength possible. With a suitably thin support and vapor plated Hall effect generators and leads, the air gap can be made extremely small. If it is desired for the synchro to produce a sinusoidal output signal variation with the angular position of the input shaft, the relatively soft iron of the return path can be machined to shape the magnetic field instead of machining the magnetized rotor.

Accordingly the principal object of the present invention is to provide an improved apparatus of the type which translates the angular position of an input shaft to an analog output signal.

Another object of this invention is to provide an improved instrument of the type translating the angular position of an input shaft into an analog output signal making use of Hall effect generators as sensing means.

A further object of this invention is to eliminate the problem of hysteresis in instruments of the type described.

A still further object of this invention is to obtain a large output signal from an instrument of the type described without errors caused by hysteresis.

A still further object of this invention is to facilitate the obtaining of a sinusoidal variation of the output signal with the angular position of the input shaft in an instrument of the type described without sacrificing output signal amplitude.

A still further object of this invention is to provide an instrument of the type described which produces an output signal having a relatively large amplitude and which is relatively easy to manufacture.

Figure 4:
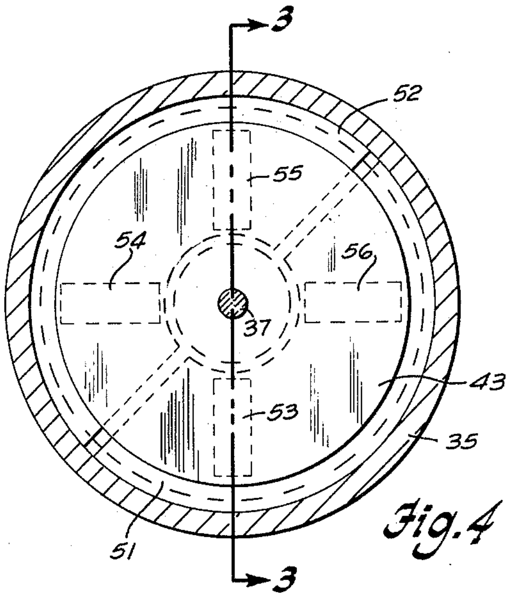
Figure 1:
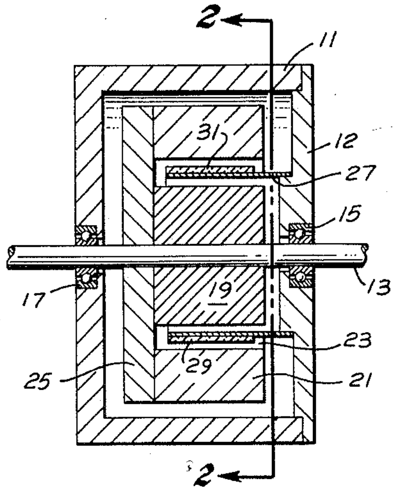
Figure 2:
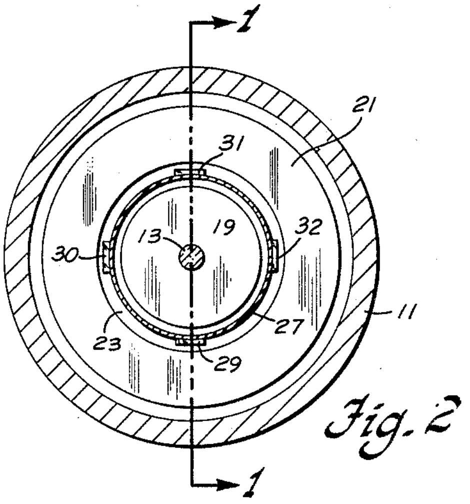

Further objects and advantages of the present invention will become readily apparent as the following detailed description of preferred embodiments of the invention unfold and when taken in conjunction with the drawings, wherein:

FIGS. 1 and 2 show sectional views of one embodiment of the invention, with the view in FIG. 1 being 'aken along the lines 1—1 in FIG. 2 and the view in FIG. 2 being taken along the lines 2—2 in FIG. 1; and FIGS. 3 and 4 show sectional views of another embodiment of the invention with the view in FIG. 3 being taken along lines 3—3 in FIG. 4 and the view in FIG. 4 being taken along the lines 4—4 in FIG. 3.

The embodiment of the invention shown in FIGS. 1 and 2 comprises a cylindrical casing 11 having an end plate 12. On the axis of the casing 11 a shaft 13 is rotatably mounted by means of bearings 15 and 17. Mounted coaxially on the shaft 13 for rotation therewith is a rotor 19, which comprises a permanent magnet having its poles on diametrically opposite sides of the shaft 13. Surrounding the rotor 19 is an annular member 21 positioned coaxially about the shaft 13. The annular member 21 is radially spaced from the rotor 19 leaving an annular air gap 23 defined between the rotor 19 and the annular member 21. The rotor 19 and the annular member 21 are joined by a disc 25 which is also mounted coaxially on the shaft 13. Thus the assembly of the rotor 19, the annular member 21 and the disc 25 is adapted to be rotated by the shaft 13. The annular member 21 comprises soft iron and constitutes a low reluctance return path for the permanent magnet of the rotor 19. A tubular support 27 is mounted on the end plate 12 of the casing 11 coaxially with the shaft 13 extending into the annular air gap 23. The tubular support 27 is made of a non-magnetic, non-conducting substance, such as glass. Mounted on the tubular support 27 in the air gap 23 are four Hall effect generators 29–32 regularly spaced about the axis of the shaft 13 at 90° intervals. The Hall effect generators are in the form of crystals bonded to the tubular support 27. The crystals of the Hall effect generators may be formed by vapor plating semiconductor layers on the tubular support 27. The annular air gap 23 is coaxial with the shaft 13 so that the assembly of the rotor 19 and the annular member 21 can rotate freely with respect to the Hall effect generators 29–32 and the tubular support 27.

With this construction, the permanent magnet of the rotor 19 provides a strong magnetic field because it must traverse only an air gap of a small width defined between the rotor 19 and the annular member 21. Since the annular member 21 rotates with the rotor 19, the strength of the magnetic field in the return path provided by the annular member 21 will always be the same and thus no hysteresis effect will result. As the rotor 19 rotates, the magnitude of the field through the crystals of the Hall effect generators 29–32 will vary, thus causing the output signals from these hall effect generators to vary with the angular position of the input shaft 13. The magnetic field is shaped in such a manner that the flux density in any given position in the air gap 23 varies sinusoidally with the angular position of the magnetic field and therefore the angular position of the input shaft 13. Since the direction of flux through the air gap 23 will always be normal to the planes of the crystals of the Hall effect generators 29–32, the output signals from the Hall effect generators will vary sinusoidally with the angular position of the input shaft 13. The desired shaping of the magnetic field is achieved by machining the annular member 21. If the angular position of the shaft 13 is taken as zero when the strength of the field is a minimum through the diametrically opposed Hall effect generators 29 and 21, then the output signal from these Hall effect generators will be proportional to the sine of the angular position of the shaft 13 and the output signal from the Hall effect generators 30 and 32, 90° removed from the Hall effect generators 29 and 31, will be proportional to the cosine of the angular position of the shaft 13.

The embodiment of the invention shown in FIGS. 3 and 4 comprises a cylindrical casing 35 having an end plate 36. A shaft 37 is rotatably mounted on the axis of the casing 11 by means of bearings 39 and 41. A disc-shaped rotor 43 is mounted coaxially on the shaft 37 for rotation therewith. The rotor 43 comprises a permanent magnet having its poles on diametrically opposite sides of the shaft 37. A second disc-shaped member 45 is also coaxially mounted on the shaft 37 for rotation therewith axially spaced from the rotor 43 by means of a spacer 47, leaving a washer-shaped air gap 49 between the rotor 43 and the disc-shaped member 45. Thus the assembly of the rotor 43, the disc-shaped member 45 and the spacer 47 is adapted to be rotated by the input shaft 37. Supports 51 and 52 each shaped like a half washer are fixed to the cylindrical walls of the casing 35 and extend into the air gap 49 surrounding the spacer 47. Four Hall effect generators 53–56 are mounted on the supports 51 and 52 in the air gap 49 at 90° angular intervals about the shaft 37. The material of the disc-shaped member 45 is soft iron and it thus provides a low reluctance return path for the permanent magnet 43. The air gap 49 is coaxial with the axis of the assembly of the rotor 43 and member 45 so that this assembly may be freely rotatable with respect to the Hall effect generators 53–56 and the supports 51 and 52.

Because the magnetic field provided by the permanent magnet of the rotor 43 must pass only through the small air gap 49 between the disc-shaped member 45 and the rotor 43, the strength of this field will be great and because the low reluctance return path provided by the member 45 rotates with the rotor 43 the magnetic field through the return path 45 will always be constant and therefore there will be no hysteresis effect. As the shaft 37 rotates, the strength of the field through the Hall effect generators 53–56 will vary and thus the output signal from each of the Hall effect generators 53–56 will vary in accordance with the angular position of the input shaft 37. The disc-shaped member 45 is machined to shape the magnetic field in such a way that the flux density in any one position in the gap 49 will vary sinusoidally with the angular position of the magnetic field and therefore of the input shaft 37. Since the direction of the flux passing through the air gap 49 is always perpendicular to the plane of the crystals of the Hall effect generators 53–56, the output signals from the Hall effect generators will vary sinusoidally with the angular position of the input shaft 37. If the input shaft position when the strength through the diametrically opposed Hall effect generators 53 and 55 is a minimum is taken to be zero, then the output signal from the Hall effect generators 53 and 55 will be proportional to the sine of the angle of the input shaft 37 and the output signal from the Hall effect generators 54 and 56, 90° removed from the Hall effect generators 53 and 55, will be proportional to the cosine of the angular position of the shaft 37.

In the embodiment shown in FIGS. 1 and 2, as well as in the embodiment shown in FIGS. 3 and 4, the roles of the members providing the permanent magnet and the low reluctance return path can be reversed. That is, the permanent magnet can be embodied in the annular member 21 with the rotor 19 providing the low reluctance return path.

The above description is of preferred embodiments of the invention, and many modifications may be made thereto without departing from the spirit and scope of the invention.

What is claimed is:

1. Rotary electromechanical apparatus comprising:

a shaft;

means mounting said shaft for rotation about its longitudinal axis;

a magnetic flux-source member of circular configuration having its poles on diametrically opposite sides and a member of low magnetic reluctance of circular configuration mounted on said shaft for conjoint rotation therewith, said members having confronting parallel surfaces defining therebetween an annular air gap symmetrically disposed about said shaft;

a Hall effect generator; and means fixedly supporting said Hall effect generator in said air gap transversely of the flux field therein, whereby the Hall effect voltage drop across said Hall effect generator varies sinusoidally with the rotation of said members of circular configuration.

2. Rotary electromechanical apparatus comprising:

a casing;

a shaft journaled in said casing;

a magnet of circular configuration, having its poles on diametrically opposite sides and a member of low magnetic reluctance, of circular configuration, co-axially mounted on and fixed relative to said shaft, said magnet and low reluctance member having spaced, substantially parallel confronting surfaces defining therebetween an annular air gap, of relatively small thickness dimension, co-axially disposed about said shaft;

a Hall effect generator of generally planar configuration; and means, fixed with respect to said casing, mounting said Hall effect generator in said air gap in a plane transverse to the thickness dimension of said gap, whereby the Hall effect voltage drop across said Hall effect generator varies sinusoidally with the rotation of said members of circular configuration.

3. Rotary electromechanical apparatus according to claim 2 wherein said confronting surfaces and the air gap therebetween are of cylindrical configuration.

4. Rotary electromechanical apparatus according to claim 2 wherein said confronting surfaces and the air gap therebetween are of planar configuration and extend radially with respect to said shaft.

5. Rotary electromechanical apparatus according to claim 2 including:

a second Hall effect generator of generally planar configuration; and means, fixed with respect to said casing, mounting said second Hall effect generator in said air gap at a location angularly displaced 90° about said shaft with respect to the first mentioned Hall effect generator and in a plane transverse to the thickness dimension of said air gap.

6. Rotary electromechanical apparatus according to claim 5 wherein the Hall effect generators are four in number and, concomitantly, said locations are spaced at 90° intervals about said shaft.

References Cited by the Examiner

UNITED STATES PATENTS

| | | | |
|---|---|---|---|
| 2,512,325 | 6/50 | Hansen | 321—45 X |
| 2,536,805 | 1/51 | Hansen | 340—345 |
| 2,924,633 | 2/60 | Sichling et al. | 324—45 |
| 3,018,395 | 1/62 | Carlstein | 310—40 |
| 3,061,771 | 10/62 | Planer et al. | 323—94 |
| 3,083,314 | 3/63 | Ratajski | 324—45 |

LLOYD McCOLLUM, *Primary Examiner.*

ROBERT C. SIMS, *Examiner.*